Feb. 7, 1939.  J. W. BRYCE  2,146,283
CARD PUNCHING MACHINE
Filed June 21, 1935   8 Sheets-Sheet 3

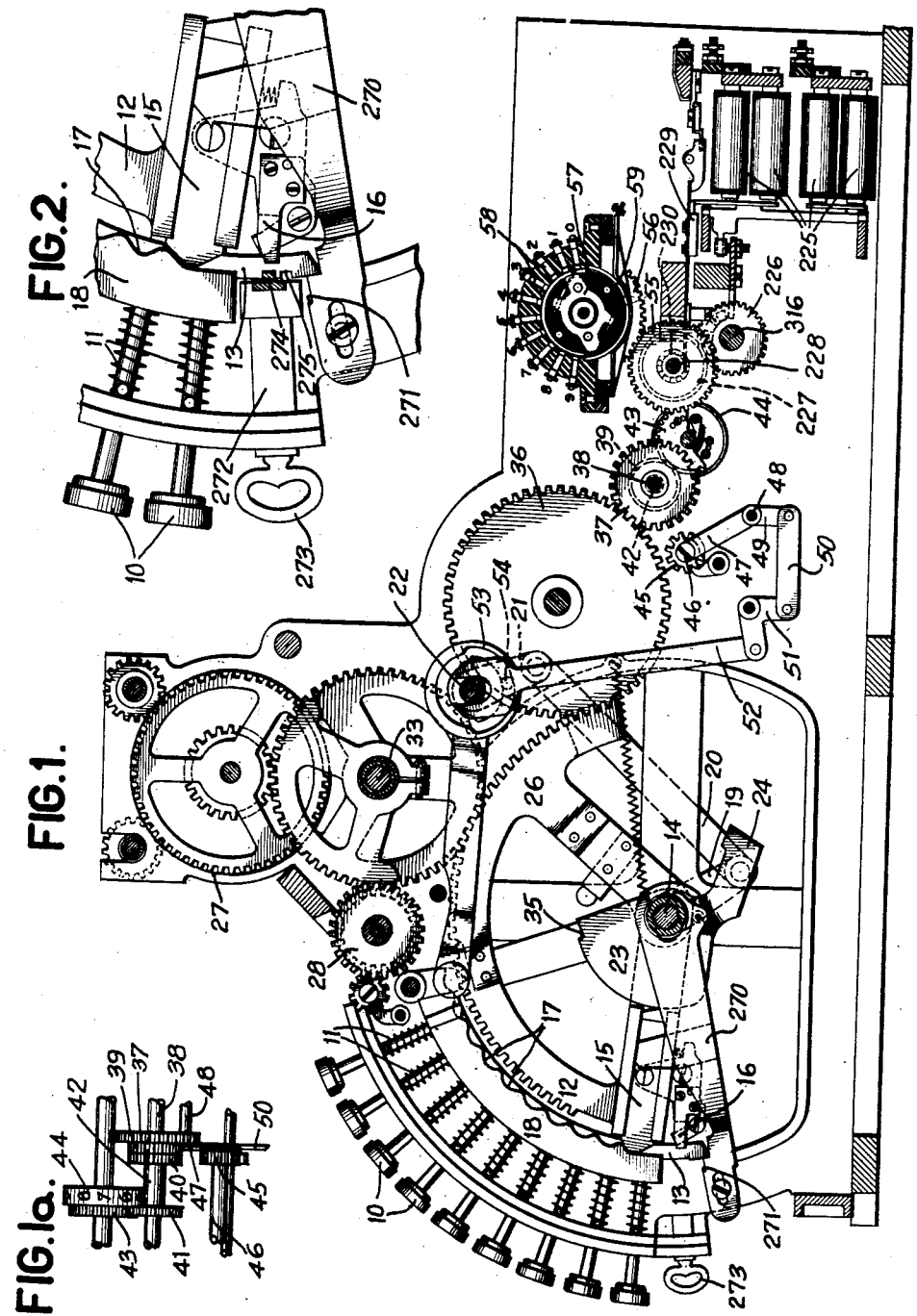

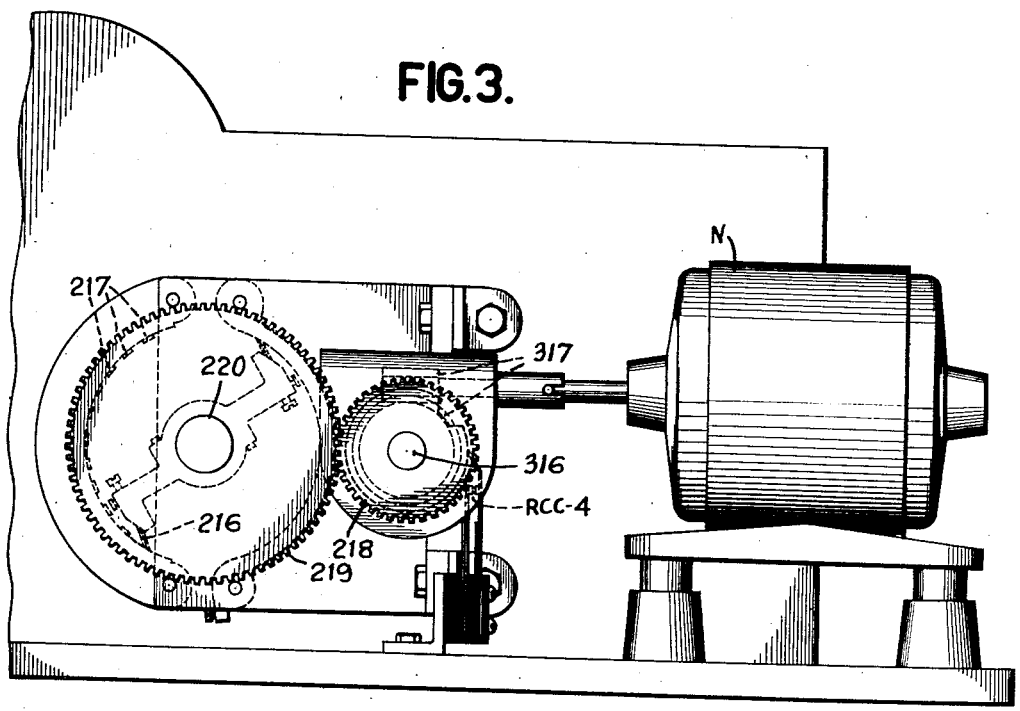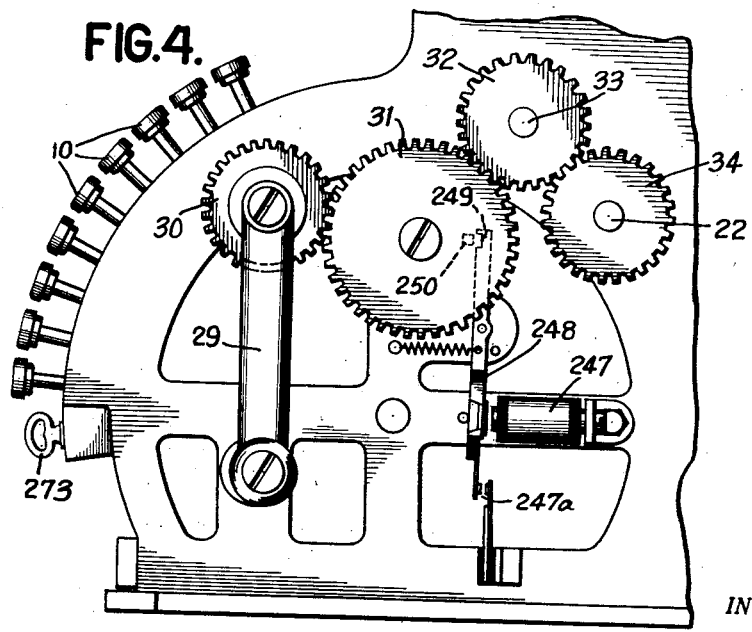

INVENTOR.
James W. Bryce
BY
W. M. Wilson
ATTORNEY

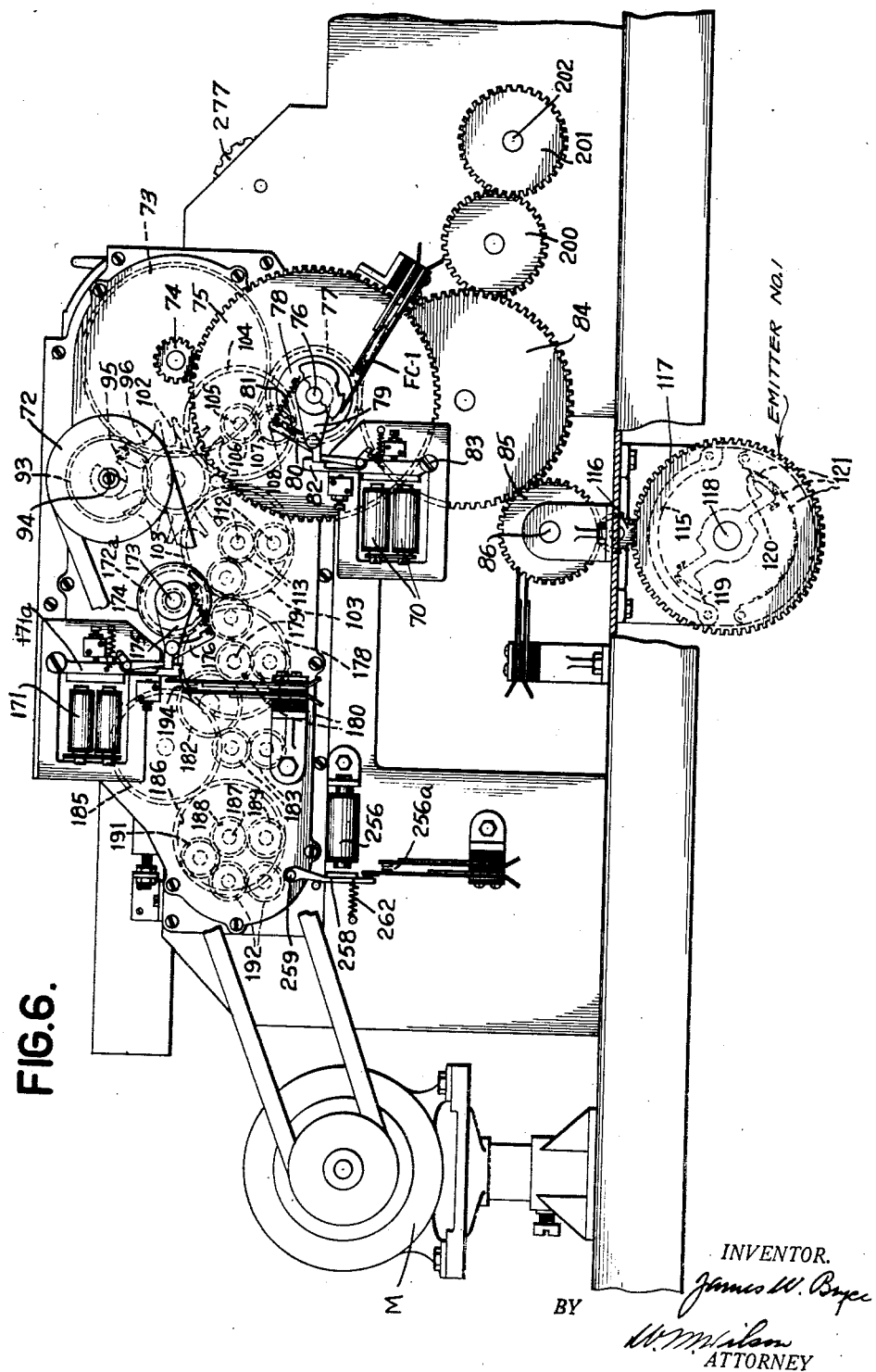

Feb. 7, 1939.  J. W. BRYCE  2,146,283
CARD PUNCHING MACHINE
Filed June 21, 1935  8 Sheets-Sheet 5

FIG.7a.

INVENTOR.
James W. Bryce
BY
W. M. Wilson
ATTORNEY

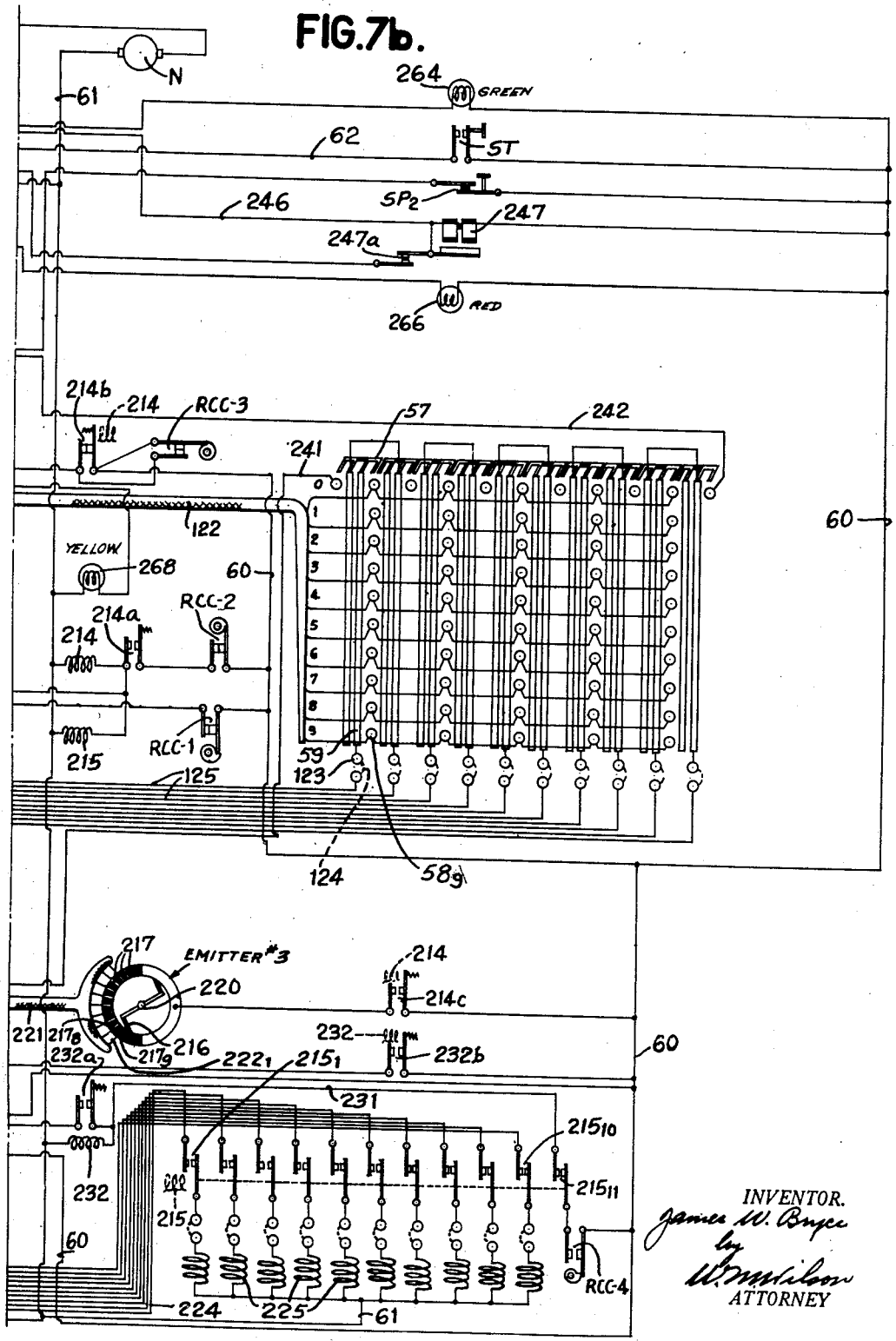

Feb. 7, 1939. J. W. BRYCE 2,146,283
CARD PUNCHING MACHINE
Filed June 21, 1935 8 Sheets-Sheet 7
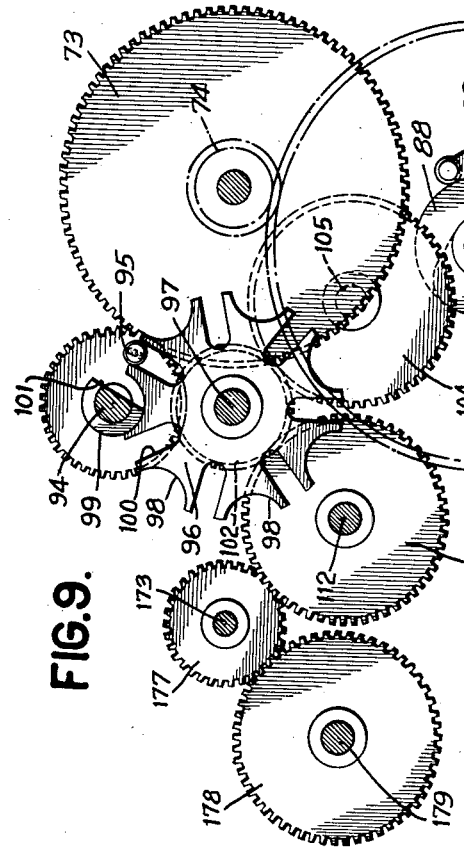
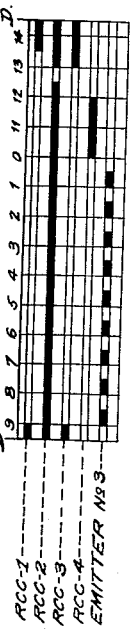
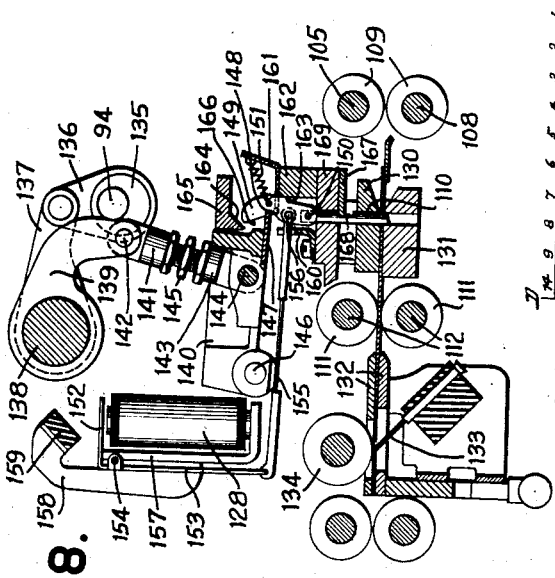
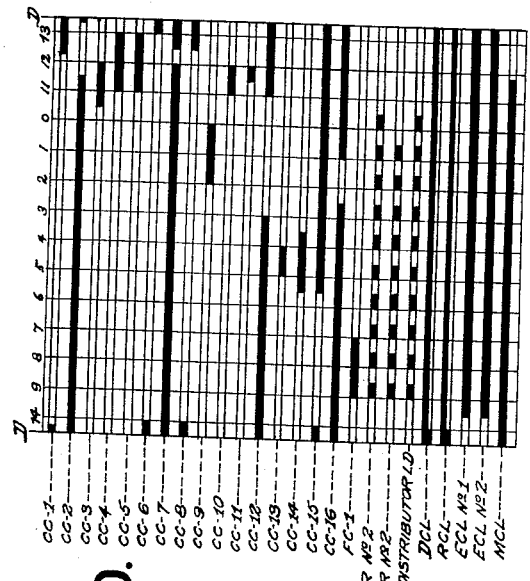

Feb. 7, 1939.     J. W. BRYCE     2,146,283
CARD PUNCHING MACHINE
Filed June 21, 1935     8 Sheets-Sheet 8

INVENTOR
James W. Bryce
BY
W. M. Colson
ATTORNEY

Patented Feb. 7, 1939

2,146,283

UNITED STATES PATENT OFFICE 2,146,283

CARD PUNCHING MACHINE

James W. Bryce, Bloomfield, N. J., assignor to International Business Machines Corporation, New York, N. Y., a corporation of New York Application June 21, 1935, Serial No. 27,634

15 Claims. (Cl. 235—61.7)

This invention relates to improvements in card punching machines and has more particular relation to improvements in punching machines which are capable of being controlled by another machine located at a distant point.

The main object of the present invention is to provide a punching machine which is capable of being controlled by a structurally separate and distantly located machine, such as a cash register, with provision of means whereby the correctness of the punching on the card can be verified by its comparison with the entry made in the cash register.

Cash registers are now equipped with one or more totalizers to secure a segregated analysis of the various classification of items entered therein. Such types of machines are relatively expensive and to avoid such complicated machines it has been the object of many inventions to construct such machines with card punching attachments whereby with the aid of existing card sorting and tabulating machines an analysis of the sales may be made in greater detail. Such punching mechanisms were usually incorporated in the cash register and it is an object of the present invention to construct the cash register so that its entry may be reflected by a card punched in a punching machine located at a distant point, usually in the bookkeeping or auditing department of the place of business. In this manner, the analysis may take place without any interruption to the operator of the cash register necessitated by frequent withdrawals of the punched cards for purposes of sales analysis.

With this object of the invention attained it is possible to locate the cash register at the place of business and by electrical connections to the punching machine control card punching operations from the cash register. The punching operations ensue automatically after its initiation by the operator of the cash register by the provision of a special key.

Obviously, the efficiency of the system is determined mainly by the accuracy of the punching operation and any discrepancy between the total amount accumulated in the cash register and by the card tabulating machine will usually signify an error in the punching operation. Such errors are only discernible by visual inspection of both machines and is usually only found, due to this reason, when a complete series of entries and card punching operations have been made.

It is, therefore, the object of the present invention to determine the accuracy of the punching operation by a comparison of the value of each card punched with the amount or value set up on a cash register immediately after punching each card. This direct comparison is instituted after each card punching operation and by suitable signalling devices the operators of both the punching machine and cash register are informed when there is an error.

It is more specifically an object of the present invention to provide a series of mechanisms in the cash register which are differentially set to represent the value entered. These mechanisms are then read out to control the punching machine to cause a card to be punched to represent this value.

The card is then analyzed to differentially set up a series of mechanisms in the punching machine to represent the value on the punched card. The series of mechanisms of the cash register is then returned to normal under control of the series of mechanisms in the punching machine, and thereafter the series of mechanisms of the punching machine is returned to normal under its own control. Suitable testing devices then act automatically to determine if both series of mechanisms are at normal. Obviously, if the value set up on the cash register is —734— and the card is punched —734— both series of mechanisms will return to normal. If the card is incorrectly punched to represent —733— the units mechanism of the cash register will be off normal and the error will be located.

It is a further object of the present invention to cause said testing devices to selectively assort the cards as to whether they are correctly or incorrectly punched and to provide suitable locking devices to lock the cash register when card punching operations are initiated and to unlock it if the card is correctly punched.

The series of mechanisms referred to comprise well known electrical read-out devices controlled by emitters. The cash register sets up brush structures of its read-out device and by a controlling emitter electrical impulses are transmitted by wires of a cable to punching control magnets at differential times to thereby punch by a set of punches holes in the columns of an intermittently moving card.

The holes of the card are then analyzed to transmit electrical impulses to magnets which differentially set up the brush structures of a read-out device of the punching machine. By means of an emitter impulses are directed at differential but complementary times to control magnets which cause the brush structures of the cash register read-out device to return to normal, if the card is punched correctly. The pivoted brush structures comprise flexible inclined wires and, obviously, they can only be moved unidirectionally and for this reason both read-out devices are returned to normal by complementary rotation of their brushes. If a brush structure was at the "7" position only three units of complementary movement are necessary to return it to "0". The brush structures of the punching read-out device are returned to normal under their own control and another emitter by causing complementary timed impulses to be directed to control magnets which cause the return of brush structures of the read-out device of the punching machine to "0". A circuit is then closed at one point to determine its continuity by the position of the brush structures of both read-out devices. If one fails to return to "0" the circuit is opened, a distinctive signal is lighted, the card is rejected and the cash register fails to unlock.

The provision of electrical control instrumentalities in both machines lends itself admirably for distant control and this object is attained by a novel electrical solution.

The various operations instituted in the punching machine proceed automatically without attention of either operator. All incorrect operations are immediately discernible, such as, failure to reset both read-out devices, whether due to incorrect card punching, mechanical or electrical failure, the failure of a card to feed in the punching machine, etc.

It is a further object of the nivention to provide for punching of repetition data on each of a series of cards. One control comes from the punching machine to punch each card to represent, for example, the clerk operating the machine. In a similar manner, there is a control in the punching machine to represent the machine number, for example.

The invention is shown by way of example applied to a well known form of cash register which is equipped with a value indicating mechanism. If a card is incorrectly punched the indicating mechanism will indicate the value that should have been punched since it is not restored to normal until at the beginning of the next cash register operation.

Instead of the cash register any other form of entry device may be used, such as, an adding machine, calculating typewriter, etc., and the invention is not to be limited by the combination herein disclosed.

The invention is illustrated by way of example in the accompanying drawings in which:

Fig. 1 is a central sectional view of a cash register of a well known form, there being shown attached to the cash register a part of the present improvements.

Fig. 1a is a plan view showing the train of gears for driving an index wheel comprising part of the present improvements.

Fig. 2 is a view in side elevation of part of the cash register key structure and also illustrates a locking mechanism whereby a depressed key may remain in depressed position for accomplishing a repetition of the same entries.

Fig. 3 is a view in end elevation illustrating the motor employed in the cash register machine for driving the brush structures of a read-out mechanism and also for rotating certain contact controlling cams.

Fig. 4 is an end view of the cash register showing the operating handle for the same and a preferred form of locking mechanism for the operating handle which is effective when improper machine operations ensue.

Fig. 6 is a view in side elevation of the punching machine disclosed in Fig. 5 and illustrates in particular the driving mechanism for the various mechanisms of the punching machine.

Figs. 7a and 7b when adjacently disposed with Fig. 7a at the left side of Fig. 7b illustrate the preferred form of electrical wiring diagram. In Fig. 7a, there is disclosed the electric instrumentalities for the punching machine while Fig. 7b discloses the electric instrumentalities for the cash register. The mid-portion of the combined sheets in a vertical line illustrates the electrical wiring connections between the two machines.

Fig. 8 is a sectional view of the punching machine showing in detail the punching and punch controlling mechanism thereof.

Fig. 9 is a sectional view of the punching machine illustrating the Geneva drive mechanism for driving the various sets of feeding rollers in a step-by-step movement.

Fig. 10 is a timing diagram of the various contact controlling cams employed in the punching unit and it also illustrates the timing of the various card levers, electric impulse distributors and emitters.

Fig. 11 is a timing diagram of the various contact controlling cams and emitter employed in the cash register.

Figure 12:
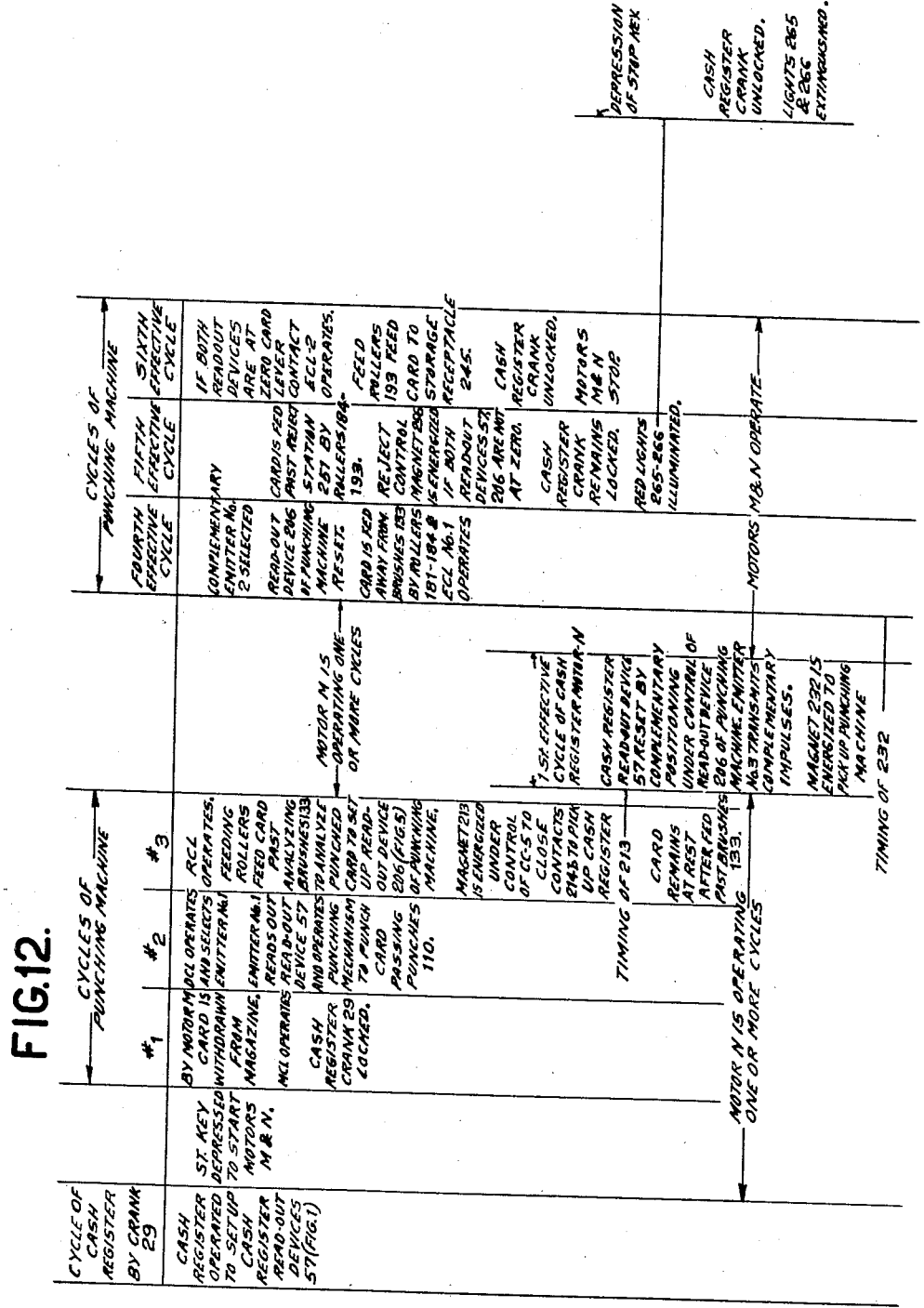

Fig. 12 is a timing diagram outlining the sequential operation and coordination of the machines.

The cash register shown in connection with the present improvements is for illustrative purposes only as any other form of item entry accounting device may be employed. The type of machine shown is well known and a complete description thereof may be found in numerous patents, particularly the patent issued to J. P. Cleal and F. A. Reinhard, No. 580,378, dated April 13, 1897.

As shown in the patent referred to the machine is provided with a series of banks of keys, of which only one bank is shown in Fig. 1. These keys are indicated by reference numeral 10 and are depressed against the tension of their springs 11 to determine the differential movement of operating segments 12. The operation of any of these keys 10 in a bank elevates its detent 13. The segments 12 are all journaled loosely on a main shaft 14 and are provided with slidable locking or latching plates 15. The segments 12 carry pivoted pawls 16 which are adapted to engage and be stopped by the inner end of any depressed key 10.

When the pawl 16 abuts a depressed key the plate 15 is moved to the left and into one of a series of notches 17 of a plate 18 thereby locking the segment 12 in adjusted position.

The main shaft 14 is arranged to be oscillated at each operation by a crank arm 19 connected through a link 20 to a second crank arm 21 rigidly mounted on an operating shaft 22 of the machine. Rigid on shaft 14 is a series of segments 23 one for each segment 12 which together with depending projections 24 serve to move the segments 12 in opposite directions in a well known manner. It will be understood that although this mechanism is shown in connection with only one bank of keys there will be a segment 12 and a cooperating mechanism for each bank. The segments 12 each carry a rack 26 which in the case of the amount keys of the banks is adapted to control the setting of an indicator wheel 27 and a totalizer element 28.

The operating handle 29 (Fig. 4) of the cash register is provided with a pinion 30 which meshes with a gear 31 which in turn meshes with a gear 32. The gear 32 is secured to one end of a transverse shaft 33 and meshes with a gear 34 secured to the transverse shaft 22.

Upon the rotation of shaft 22 by the crank handle 29 by the gear drive just described all of the segments 12 which have previously been differentially positioned will be first rocked counterclockwise by the projections 24. Upon the return or clockwise movement of the segments 23 shoulders 35 formed on the segments 23 will be engaged by the slides 15 of the banks in which keys have been depressed, so that the actuators 12 carrying the latches or pawls 16 of the banks in which keys are depressed will also be carried rearwardly distances determined by the values of the key depressed.

The actuators 12 are returned to their normal positions at the beginning of each operation of the machine by the extensions 24 which engage with the actuators 12 and thereby carry them to their normal positions.

The operation of the type of cash register shown is briefly explained herein as it is so well known by those skilled in the art.

It will be understood that after a rack 26 has been returned to normal from its previous differential adjustment it is then turned clockwise a differential amount to set up value corresponding to the key depressed. This clockwise movement of rack 26 is utilized to set up an item wheel to represent the value entered and a plurality of such units are provided to take care of a plurality of denominational orders, although a description of only one order is herein given.

Continuously in mesh with the segment rack 26 is a gear 36 (Fig. 1) meshing with a gear 37 loose on a rod 38. Attached to the gear 37 is a gear 39 (Fig. 1a) and adjacent the gear 39 is a gear 40. The gear 40 is sleeved to a gear 41 by a sleeve 42 loosely surrounding the shaft 38. The gear 41 meshes with a gear 43 attached to an index wheel 44. In alignment with the adjacent gears 39 and 40 is a broad pinion 45, that is, it is of sufficient width to engage with both gears 39 and 40 when shifted to a position to engage with both gears 39 and 40. This engagement is provided to communicate the clockwise movement of gear 39 to the gear 40 and thus to the index wheel 44 to thereby set up on said wheel 44 a value corresponding to the key depressed. The means for accomplishing this function will now be described.

The gears 45, of which there are several, are carried on a rod 46 supported by arms 47 attached to a shaft 48. Secured to the shaft 48 is an arm 49 having a link connection 50 to a bell crank 51 to which is connected a pitman 52. A cam 53 fast on the shaft 22 cooperates with a roller 54 on the side of the pitman 52 to throw the pinions 45 into mesh with the pairs of gears 39, 40 so that the counterclockwise differential movement of gears 36 will be communicated to the various item wheels 44. After the segments 26 have been given their differential movements the cam 53 will withdraw the broad pinions 45 out of mesh with the pairs of gears 39, 40 and they will remain so disengaged during the counterclockwise or restoring movements of the segment racks 26 at the next operation of the machine.

The above described mechanism is essentially the same as that shown in connection with the engaging mechanism for the totalizer utilized in the machine disclosed in the aforesaid Cleal and Reinhard Patent No. 580,373.

In mesh with the gear 43 is a gear 55 (Fig. 1) which is in mesh with a gear 56 to which is secured a brush structure 57 so that the brush structure 57 is angularly displaced according to the setting of the item wheel 44. The brush structure carries two brushes, one of which engages with one of a series of segments 58 and the other of which engages a common segment 59, the dimension of which is such that irrespective of which segment 58 is engaged one of the brushes engages with the common segment 59. The above described commutator or read-out mechanism is fully shown and described in the patent to G. F. Daly, No. 1,921,454, dated August 8, 1933. Therefore, it will be evident that after the operation of the cash register the brush structures 57 will take different positions dependent upon the keys depressed.

The aforesaid commutator structure is utilized to control the punching of a card to represent the value of the keys depressed and which mechanism will now be described with particular reference to Figs. 5 and 6.

It should be noted that the register is intended to be used at the place where sales in a business are made while the punching device is located at a distant place, preferably in the bookkeeping or auditing department so that as the various sales are made a card is punched at a distantly located place to give unchangeable records of the sales made. Hence, it will be observed that the punching machine disclosed in Figs. 5 and 6 is structurally separate from the cash register or other item entry controlling device and distantly located, although they are electrically interconnected for control operation to be described.

Figs. 7a and 7b when adjacent in the order they are just mentioned disclose the preferable form of electrical wiring diagram. When an amount is to be punched on the card the operator depresses a start key ST mounted on the cash register but only disclosed in the wiring diagram in Fig. 7b. This completes a circuit, described from the negative line side 60, through contacts ST, a wire 62, magnet 63 to the positive line side 61, thus energizing magnet 63 which causes a series of contacts 63a, 63b, 63c, and 63d to close.

The circuit for the motor M of the punching device is now completed since its circuit is from the positive line side 61, through motor M, contacts 63b, to the negative line side. The circuit for the motor N (Fig. 3) of the cash register is also closed as it leads from the positive line side 61, through motor N, contacts 63b to the negative line side 60. Motors M and N now operate.

A stick circuit for magnet 63 to retain its series of contacts 63a, 63b, 63c, 63d closed is provided by a line wire 64, leading from closed contacts 63a to contacts CC—2 now closed, to the negative line side 60, and another stick circuit leads from contacts 63a, wire 65, and relay contacts 66c closed when magnet 66 is energized, and thence to the negative line side 60. The circuit for the energization of magnet 66 will be described later.

The blank cards to be punched have been placed in a magazine 67 (Fig. 5) of the punching machine so that the lowermost card rocks a pivoted card lever 68 to close contacts MCL. Obviously, as long as there are cards in the magazine 67 and the contacts MCL will be closed continuously but when the last card is fed out of the magazine the timing of the contacts MCL will be as shown in Fig. 10. That is, the trailing edge of the last card will leave the card lever 68 late in the cycle and open contacts MCL. From Fig. 7a it will be evident that this will close the circuit of the magnet 69, thereby causing the energization of the same, and the closure of contacts 69a.

A circuit for a card feed clutch magnet 70 is closed when cam contacts CC—1 close and which is described as follows: from the positive line side 61, (Fig. 7a) magnet 70, contacts 63c now closed, contacts 69a now closed since there is a card in the magazine 67, contacts 66b closed normally by a spring attached to one contact blade, the circuit being closed, to the negative line side 60 when contacts CC—1 are closed by an operating cam.

From Fig. 6 it will be evident that motor M drives a pulley 72 to which pulley there is secured a pinion 93 driving a gear 73 to which there is secured a pinion 74 meshing with a gear 75 which is loosely mounted on a shaft 76 but attached to which is another driving gear 77.

Attached to gears 75 and 77 is a notched disk 78 loose on shaft 76. Adjacent the disk 78 is an arm 79 secured to shaft 76 and carrying a clutch pawl 80 pivoted thereon. The pawl has an extension adapted to fit in the notch of the disk 78 and is urged to engage the disk by a spring 81.

However, the pawl is held disengaged by an armature latch 82 which engages an extending arm on the pawl. When the card feed clutch magnet 70 is energized the associated armature is attracted and latch 82 is rocked to the left about pivot 83, releasing pawl 80 and connecting shaft 76 to the driving gears.

The gear 77 which it will be observed is continually rotating is in mesh with a gear 84 which is in mesh with a gear 85 secured to a shaft 86. The shaft 86 carries a series of cams adapted to close contacts designated herein as the CC contacts one of such for instance, being the contacts CC—1. Therefore, these are closed at a certain point in the cycle to cause energization of the card feed clutch magnet 70.

When shaft 76 is operated a pair of complementary cams 87, 88 (Fig. 9) fast thereto are operated. A two-armed lever 89 secured to a shaft 90 carries a pair of rollers cooperating with the cams 87, 88, so as to rock the shaft 90. Attached to the shaft 90 are sector arms 91 (Fig. 5) provided with gear teeth that mesh with racks on the picker slides 92. A knife 93 attached to the slides is adapted to engage the bottom card in hopper 67 and move the card to the left (Fig. 5) when the picker slides 92 are reciprocated by the cams 87, 88 on the shaft 76.

The gear which drives the gear 73 (Fig. 6) and which is attached to the pulley 72 is designated by numeral 93 and the same is attached to a shaft 94 and rotates continually.

A roller 95 (Fig. 9) on a stud extending from the gear 93 forms a means for driving a Geneva step motion gear 96 with an intermittent movement. The Geneva gear 96 is attached to a shaft 97 but is locked in each position by the cooperation of a concentric formation 98 at the end of each radial extension with a hub 99 on shaft 94. The roller 95 moves idly for the greater part of the arc about shaft 94 until it engages in one of the slots 100 in gear 96. The gear is moved with a gradually accelerated and then gradually retarded motion which is stopped as the roller 95 slips out of a slot 100. The gear 96 is released for each step of movement by a depression 101 in the side of hub 99. The depression 101 is presented only when the roller 95 is in position to drive the gear 96.

Attached to the shaft 97 is a gear 102 which meshes with a gear 103 and a gear 104. The gear 104 is attached to a shaft 105 to which is secured a pinion 106 (Fig. 6) in mesh with a pinion 107 attached to a shaft 108. As shown in Fig. 5 a pair of rollers 109 is secured to the shafts 105 and 108 and thereby the card is fed between the rollers 109 and to a series of punches 110 in a step-by-step motion. To feed the card as it passes the series of punches there is provided a pair of rollers 111 (Fig. 5) attached to shafts 112. Shafts 112 are intergeared by pinions 113 (Fig. 6) and the uppermost gear 113 is rotatable with the gear 103.

Therefore, the card is fed by the pairs of rollers 109, and 111 in a step-by-step movement past the line of punches 110, of which there is one for each column of the card.

Figure 5:
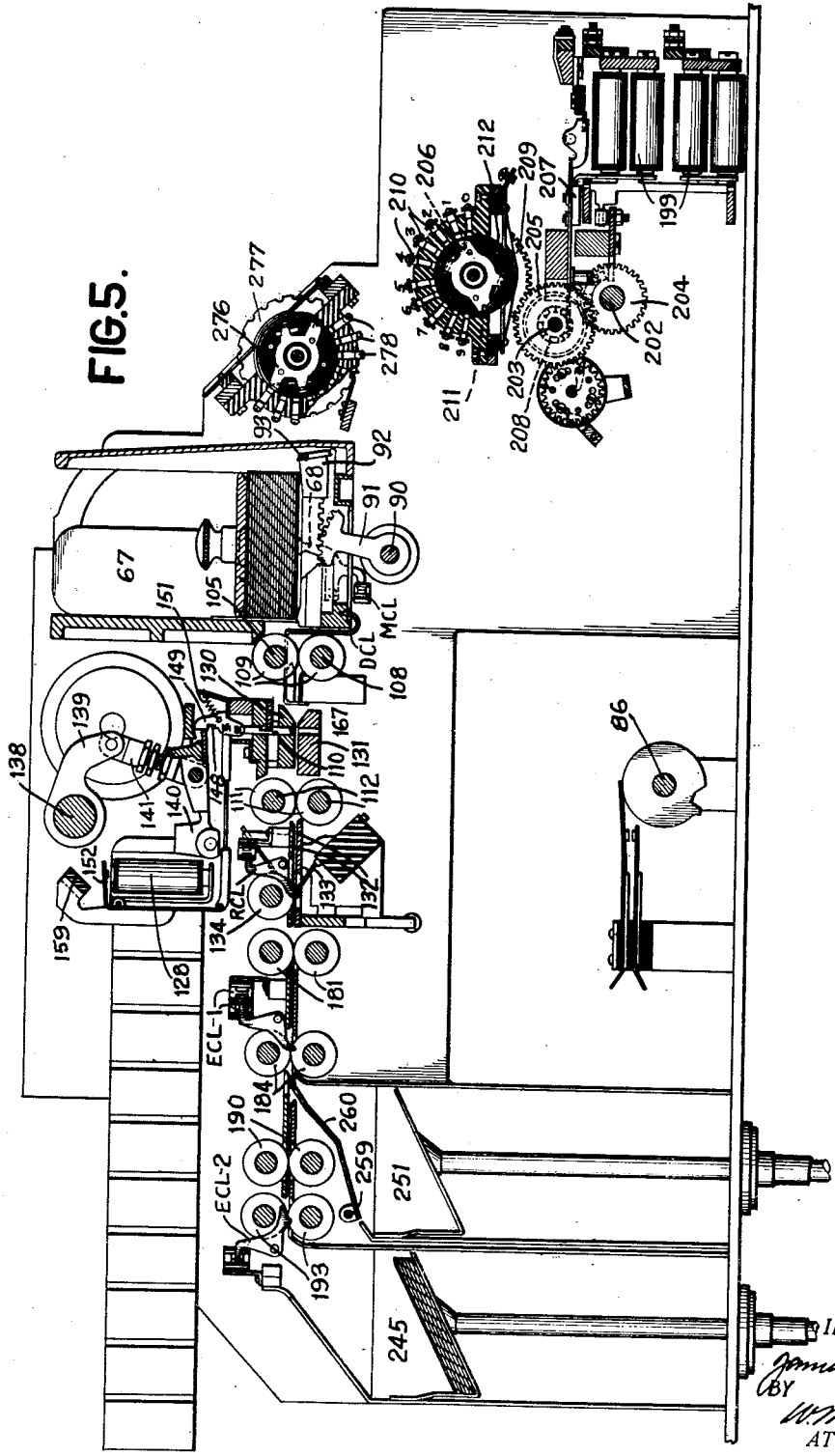
Fig. 5 is a longitudinal sectional view of the punching machine which is adapted to punch cards representing the item entered in the cash register and also shows a read-out mechanism and a card sorting mechanism whereby properly and improperly punched cards are sorted from each other.

Referring to Fig. 5 and the wiring diagram when the card emerges from the hopper 67 it operates to close the die card lever contacts DCL (Fig. 7a at the right of a horizontal central line) thereby extending the negative line side 60 to a commutator ring 115 of an emitter shown in Fig. 7a and designated "Emitter No. 1." It is well known that cam contacts may be timed by a cam to close at the end of one cycle and continue the closure for the first part of the next cycle as illustrated for CC—1 in Fig. 10. This same overlap is provided by the cards for card lever contacts DCL and RCL. The first card will close such contacts at the "14" point in the cycle, keep the contacts closed during the remaining part of the cycle, and such contacts are also closed during the first part of the next cycle from "D" to "14." The larger heavier timing line between "D" and "14" indicates this overlap. The above makes it clear that successive cards keep contacts DCL and RCL closed. As shown in Fig. 6 the gear 85 meshes with an idler pinion 116 which is in mesh with a gear 117 attached to the shaft 118 of the emitter in the punching machine. The brush 119 engages the segment 115 and the brush 120 engages one of a series of segments 121. By the gear driving connections shown the segments 121 are caused to be engaged by the brush 120 in the order that the corresponding index points of the card to be punched are presented to the punches 110 of the punching machine. From the segments 121 there are wire connections in a cable 122 which lead from the punching machine and as shown in Fig. 7a to electrical devices of the distantly located cash register. If, for example, the brush structure 57 (Fig. 1) should be positioned to represent "9" then the card will be perforated at the nine index point position to represent "9" by the following electrical connections. At the time the "9" index point is beneath the punch 110 brush 120 engages the "9" segment 121, extending the line through a wire in cable 122 to the segment $58_9$ (Fig. 7b)

which is engaged by its related brush structure 57 and by its commutator segment 59 the line is extended to a plug socket 123.

By a plug connection 124 the line extends by a wire 125 to a socket 126, and thence by a plug connection 127 to a punch control magnet 128, which leads to the positive line side 61. Only one emitter is necessary for a series of read-out devices of the cash register and the banks of keys which are to control punching operations are selected by the plug connections 123. Also punching in the desired card columns can be selected by the plug connections 127. Thus, as the card is stepped along it is punched in the various columns. Any suitable punching mechanism may be provided and the following is a description of a preferred form which is shown in detail in the application of C. D. Lake, Serial No. 685,379, August 9, 1933, now Patent No. 2,032,805, dated March 3, 1936.

After leaving the first set of rollers 109 the card is fed between a stripper plate 130 and die plate 131. Then the card enters between the pair of feed rollers 111 which feed it between guide plates 132 of a sensing station. A card lever RCL (Fig. 5) is operated as the card passes between sensing brushes 133 and a contact roller 134.

The selective operation of the punch plungers 110 will be explained with reference to Figs. 5 and 8. In Fig. 8 it is noted that the continually rotating shaft 94 is formed with an eccentric 135 which is encircled by an arm 136. The upper end of this arm is pivotally connected to an arm 137 on shaft 138 which is provided with another pair of arms 139. Between these arms 139 and a punch operating bail 140 there is provided an adjustable turnbuckle connection. A threaded rod 141 is pivoted at 142 on arm 139, and another rod 143 is pivoted at 144 on bail 140; both rods being connected by a double ended bolt 145 which is adjustable to vary the position of the bail 140.

The bail 140 is pivoted on a stud 146 in the main side frames and carries a punch actuating bar 147 which is adapted to cooperate with notches 148 (Fig. 5) in any of a plurality of selected interposer pawls 149. Each of the punch plungers 110 has an interposer pawl 149 which is pivotally connected thereto by a pin 150. Normally the pawl 149 is held out of the path of the bar 147 (see Fig. 5) and the plunger 110 is held above the die by a spring 151 attached to the pawl. However, when a magnet 128 is energized, the associated pawl is drawn into cooperation with bar 147 and the related plunger is subsequently depressed to perforate the card.

The armature 152 of the punch controlling magnet 128 is part of a lever 153 pivoted at 154. The lower end of lever 153 is pivotally connected to a call wire 155 the other end of which is pivoted at 156 on pawl 149. A plurality of such connections are made, one to each pawl, the magnets 128 being arranged in staggered rows and columns. The brackets 157 carry the magnets of one row as a unit, and have arms 158 which hold an insulation bar 159 suspended above the magnets to function as a terminal bar.

When attracted, the armature 152 swings the lever 153 in a clockwise direction, Fig. 8, and draws the wire 155 to the left, urging pawl 149 into cooperation with bar 147. The wires 155 are guided by a slotted plate 160, and the pawls 149 are aligned by slots in a plate 161 fastened on a supporting bar 162, the plate 161 also being used to secure one end of springs 151. The edge of bar 162 cooperates with a cam face 163 on each of the pawls 149 to hold the selected pawls into cooperation with bar 147 as the bar 147 is lowered.

An extension 164 on a fixed bar 165 cooperates with the upper ends of the pawls to cam them in a clockwise direction out of engagement with the ascending bar 147 on the return stroke of the bail. In order to positively hold the pawls in disengaged position, the end of bar 147 cooperates with a cam face 166 on each pawl. There is a limit to the downward motion of the plungers 110 because of the presence of a fixed bar 167 which projects into notches 168 cut in the side of plungers 110. The plungers are guided above the holes in the die 131 by sliding in holes in a fixed bar 169 and the stripper plate 130.

The operation of punching is timed to occur during the pause in card feeding when the Geneva wheel 96 (Fig. 9) is not in action. The eccentric 135 (Fig. 8) is placed on the shaft 94 in such a position that the bail 140 is reciprocated while the roller 95 is out of engagement with wheel 96. As the bail 140 and bar 147 are reciprocated, any of the pawls may be moved over by the call wires until notches 148 engage the end of bar 147. Then the connected pawls and plungers are depressed to perforate the card and quickly withdraw therefrom to permit the feeding of the card to continue to the next index position.

Referring to the wiring diagram, it will be recalled that magnet 63 is held energized by the closure of contacts CC—2, since closure of contacts 63a is retained by the continued depression of the start key ST, the operating cycle being so short in time that the operator will hold the key ST depressed sometime during the closure of the CC—2 contacts. Therefore, since contacts CC—1 are closed at the start of the next operating cycle all necessary operations including the energization of the card feed magnet 70 will always be effected at a definite point in the first cycle, although the cams on shaft 86 may not have been at a normal starting position when key ST was manually depressed.

A cycle is herein considered to be a single revolution of the cam carrying shaft 86 (Fig. 6).

After the start of the feeding of a card cam contacts FC—1 close. These contacts, as shown in Fig. 6 are closed by a cam secured to the driven shaft 76 and therefore, as shown in Fig. 7a cause the energization of the relay magnet 66 and closure of contacts 66c, thereby closing a stick circuit for relay magnet 63. To cause continued energization of magnet 63 there is provided a stick circuit for magnet 66 described as follows: from the positive line side 61, magnet 66, relay contacts 66d, the left contacts 243b now closed, ejector card lever contacts ECL—1 now closed, to the negative line side 60. Therefore, contacts 66a will remain closed as long as the last described stick circuit is held closed. The motors M and N will continually operate because contacts 63b are held closed by continued energization of relay magnet 63.

Attention is directed to the fact that when contacts 66b are opened due to the energization of relay magnet 66 the circuit for card feed clutch magnet 70 is opened to prevent repeated energization of this magnet 70 even though contacts CC—1 close during the next cycle of operation. Hence, only one card will be fed from the hopper 67 (Fig. 5) during the successive cycles of machine operation. The pair of rollers 111 continue to rotate so as to feed the card past the analyzing brushes 133. The first cycle of operation in which card feed occurs brings the leading edge of the card to the line of punches 110, while the second cycle of operation in which punching occurs brings the leading edge of the card to the analyzing brushes 133, at which position of the card, card lever contacts RCL will be closed. From Fig. 7a it will be evident that closure of card lever contacts RCL during the second cycle of operation will cause relay magnet 170 to be energized which will cause the closure of its contacts 170a and 170b.

During the first part of the second cycle of machine operation the aforementioned card lever contacts DCL closed and when contacts CC—4 close at the end of this cycle a circuit described as follows is closed, from the positive line side 61, a feeding roller clutch magnet 171, wire 172, cam contacts CC—4, card lever contacts DCL, to the negative line side 60. Magnet 171 is shown in Fig. 6 and is adapted to cause the operation of supplemental sets of feeding rollers during the third cycle of machine operation, in which the punched card is analyzed.

Referring to Fig. 6 it will be evident that the gear 103 is in mesh with a gear 172a which is loosely mounted on a shaft 173 but rotatable with a notched disk 174. Secured to the shaft 173 is an arm 175 carrying the usual clutch pawl 176. To the shaft 173 there is secured a gear 177 (Fig. 9) in mesh with a larger gear 178. While in Fig. 9 it appears that the gear 177 is in mesh with gear 103 it should be noted that gear 103 is in a different plane and is in mesh with the gear 172a, as shown in Fig. 6. The armature of clutch magnet 171 is designated by numeral 171a. The operation of this clutch is similar to the clutch controlled by magnet 70 and a more detailed description, therefor, need not be given. At the beginning of the start of the third machine cycle, the notch in disk 174 will be engaged by the clutch pawl 176 and gear 178 will then be driven in a step-by-step fashion since it is controlled by the Geneva gear wheel 96. Gear 178 is secured to a shaft 179 and by intermeshing gears 180 drives a pair of rollers 181 (Fig. 5). A gear 182 (Fig. 6) in mesh with one of the gears 180 drives one of a pair of intermeshing gears 183 to drive a pair of feeding rollers 184 (Fig. 5). Meshing with gear 178 (Fig. 6) is a gear 185 in mesh with a gear 186 secured to a shaft 187. Shaft 187 carries a gear 188 in mesh with a gear 189 to drive a pair of feeding rollers 190 (Fig. 5). Idler gear 191 (Fig. 6) driven by a gear 188 is in mesh with one of a pair of intermeshing gears 192 to drive the last set of feeding rollers 193 (Fig. 5).

It should be observed that magnet 171 is held energized after the first revolution of the disk 174 to prevent a disengagement of the clutch pawl 176 from the disk 174 after the first revolution of the disk 174. This is done because the gear ratios selected and employed in the machine of Patent No. 2,032,805 require a second revolution of shaft 173 during the middle of the third cycle of machine operation so as to feed in the present machine the card entirely past the analyzing brushes 133. Referring to the wiring diagram Fig. 7a and Fig. 6, it will be seen that the armature of clutch magnet 171 closes contacts 194 when clutch magnet 171 is energized. During the last part of the second cycle as previously stated when contacts CC—4 close to energize clutch magnet 171 contacts CC—16 are also closed at this time and the latter are retained closed during the middle of the third cycle of machine operation to retain the energization of magnet 171 during the third cycle of operation by providing a stick circuit for magnet 171 through contacts 194. By timing contacts CC—16 so as to be closed at the completion of the first revolution of shaft 173 the continued energization of magnet 171 will retain pawl 176 in engagement with the notch of disk 174 and as the pawl 176 will not be rocked out of engagement with the notch of the disk a second revolution thereof will be effected. Card lever contacts DCL by virtue of the passage of the card past the relatied card lever have opened and are, of course, open at the end of the third cycle of operation so that even though contacts CC—4 and CC—16 close during the end of the third cycle of operation the circuit to magnet 171 will not be closed and the card will be stopped between rollers 181 and 184.

During the third cycle of operation the punched card is fed past the analyzing brushes 133 with a step-by-step motion. Referring to Fig. 7a, and recalling that card lever contacts RCL are closed during the third cycle of operation and, therefore, relay magnet 170 is energized to retain contacts 170b closed, contacts 170b extend the negative line side 60 by a wire 194a through an impulse distributor ID to a brush 195 in continuous contact with the metallic contact roller 134.

The series of brushes 133 engage the roller 134 through the card perforations. By means of plug connections 196 the card columns which are perforated are selected for control operations and obviously the columns selected will correspond to those punched by punches 110. From plug connections 196 there are wire connections 197 connected to relay contacts 198 which are now closed. The series of relay contacts 198 is connected to clutch control magnets 199, all of which are wired to the positive line side 61. As the perforations are analyzed during the passage of the card obviously the clutch control magnets 199 will be energized at differential times. The magnets 199 are also shown in Fig. 5 and, obviously, are a part of the punching machine.

From Fig. 6 it will be observed that the continually rotating gear 84 is in mesh with a gear 200 which is in mesh with a gear 201 secured to a shaft 202. The shaft 202, as will be observed from Fig. 5, drives a shaft 203 by means of a gear 204 secured to shaft 202 which is in mesh with a gear 205 secured to shaft 203. The gear 203 rotates continually and in synchronism with the shaft 173 (Fig. 6) which drives the feeding rollers which feed the card past the analyzing brushes 133.

The magnets 199 are adapted to set brushes 206 of a read-out device in the punching machine in a manner by means similar to that shown in and described in the aforementioned Patent No. 1,921,454. In general, a magnet 199 is adapted to attract its armature to release a clutch control lever 207 to permit a clutch connection to be effected by a clutch 208. This clutch will connect the shaft 203 with a gear 209 to rotate the latter when the magnet 199 is energized.

This rotation will commence when a perforation is analyzed and terminate at the end of the cycle, thus setting the gear 209 and the brush 206 rotatable therewith a differential amount. Brush 206 will now engage with a particular segment 210 while the other brush 211 will engage with a segment 212. In this manner the perforations of the card are read out and set up on the read-out device shown in Fig. 5.

The impulse distributor I. D. referred to and shown in Fig. 7a is of the usual construction and comprises a commutator rotating synchronously with the feeding of the card. Wire 194a is connected to a ring of the commutator which is electrically connected to all the segments, while the brush connected to the contacts 170b engages the segments at the times the analyzing brushes 133 analyze the index-points of the card. Hence, if there is a perforation at a particular index-point an electrical impulse will be directed to the appropriate magnet 199.

During the third cycle of machine operation it will be recalled card lever contacts RCL (Fig. 5) closed causing, as stated, the energization of relay magnet 170 (Fig. 7a) and the closure of relay contacts 170a. When cam contacts CC—5 close at the end of this cycle a circuit for a relay magnet 213 will be closed through the relay contacts 170a, as shown in Fig. 7a. A stick circuit for relay magnet 213 will be effected by the closure of relay contacts 213a closed by relay magnet 213, extending the circuit from contacts 213a to spring closed contacts 214b (Fig. 7b) and thence to the negative line side 60. Contacts 214b and the related relay magnet 214 are located in the cash register.

When relay magnet 213 is energized contacts 213b (Fig. 7a) close. Relay magnet 214 and a relay magnet 215 (Fig. 7b) are each connected to the positive line side 61 and both are in series with contacts 213b (Fig. 7a). The circuit for magnets 214 and 215 in the punching machine then extends from contacts 213b in the punching machine through contacts RCC—1 in the cash register to the negative line side to thus cause relay magnets 214 and 215 to be energized since cam contacts RCC—1 are closed at the beginning of a cycle of machine operation of a read-out device in the cash register.

Referring now to Fig. 3 it will be evident that motor N, which at this time is running continually, drives a shaft 316 through a worm wheel and gear mechanism 317 and shaft 316 is adapted to rotate a series of cams for closing contacts in the cash register designated as, RCC—1, RCC—2, RCC—3 and RCC—4; cam contacts RCC—4 being shown in Fig. 3.

Shaft 316 continually revolves and while the magnet 213 may be energized at any time during the cycle of operation of shaft 316, cam contacts RCC—1 close at the end of one cycle of operation of the shaft 316 and are closed at the beginning of the cycle of operation of shaft 316 to initiate certain operations in the cash register at a definite time in the first effective cycle. This is analogous to depression of the start key ST when the contact operating cams of the punching machine may be off normal but causing its operations to start at a definitely timed starting point in the first cycle.

When relay magnet 214 is energized, referring to Fig. 7b, relay contacts 214b will open thereby attempting to open the stick circuit of magnet 213 but to prevent this contacts RCC—3 are shunted across the relay contacts 214b and they keep the stick circuit of relay magnet 213 closed during the opening of contacts 214b and for a short time thereafter to thus prevent deenergization of relay magnets 214 and 215 by the opening of contacts 213b.

A stick circuit for relay magnets 214 and 215 is provided by contacts RCC—2, which are closed at the time contacts RCC—1 close, and contacts 214a which are now closed due to the energization of relay magnet 214. As stated above the energization of magnet 214 is held over by cam contacts RCC—3 and contacts 214a are closed when contacts RCC—2 close.

Due to the above described circuit for relay magnet 214 contacts 214c (Fig. 7b) are closed by the energization of relay magnet 214 to perform a function now to be described.

Contacts 214c are closed by the energization of relay magnet 214 and the latter is held energized by the cam contacts RCC—2 during the time a brush 216 (Fig. 7b) of an emitter designated "Emitter #3" in Fig. 7b passes the series of nine segments 217. The emitter just described is also shown in Fig. 3 and the brush structure thereof is rotated by means of a gear 218 secured to shaft 316 meshing with a gear 219 secured to a shaft 220 to which the brush structure 216 is secured. As the brush 216 passes the segments 217 a series of impulses will be transmitted by lines wires in a cable 221 (Fig. 7a and Fig. 7b) connected between the cash register and the punching unit.

With respect to Fig. 5 it will be recalled that the brushes 206 of the read-out device in the punching machine have been differentially set in accordance with the values punched on the record card, since the analyzing of the card by brushes 133 determined their differential setting. The brushes 206 are also shown in the lower left-hand corner of Fig. 7a and also the segments 210. The horizontal series of segments 210 for the same digit is connected in multiple, as explained fully in the aforementioned Patent No. 1,921,454 since a single emitter may be used to send impulses for a plurality of orders of the read-out device. Segments 210 are connected by ten line wires 222 to the segments 217 but the electrical connections are made in an inverse manner. That is for example, the segment 217₉, of the emitter designated "Emitter No. 3" in Fig. 7b is connected to all the segments 210 representing the digit "1", segment 217₈ to all segments representing the digit "2", etc. Now if a brush designated 206₁ should engage segment 210₁, when brush 216 engages the segment 217₉ an impulse will be directed from the negative line side 60, (Fig. 7b) contacts 214c, through the emitter, line wire 222₁, (Fig. 7a) segment 210₁, brush 206₁, to its common segment 212 and thence by a wire 224 to contacts 215₁, (Fig. 7b) now closed, to magnet 225 and thence to the positive line side 61. Hence an impulse will be directed at the "9" point in the cycle instead of at point "1" since brush 210₁ was previously set to represent the digit "1". In a similar manner, electrical impulses are directed to magnets 225 at points in the cycle which are complemental to the amount represented by the setting of the various brushes 206.

Referring to Fig. 7b a series of contacts 215₁₋₁₀ and 215₁₁ are closed by the previous energization of the relay magnet 215. Magnets 225 are arranged in the cash register, as shown in Fig. 1, and they are adapted to cause the rotation of the brushes 57 from their differentially adjusted positions a complemental extent, and if all adjustments were correctly made, to a normal starting or "0" position; in which case the brush previously engaging the segment 58₉ now engages the "0" segment 58.

Shaft 316 (Fig. 1) which is continually rotating has attached thereto a gear wheel 226 in mesh with a gear 227 secured to a shaft 228. When a magnet 225 is energized it is adapted to effect the usual clutch connection between the shaft 228 and gear 35. When magnet 225 is energized it releases a clutch lever 229 to engage a clutch 230, one element of which is secured to the shaft 228 and the other to the gear 55. The clutch device referred to is well known and described in many patents, and Patent No. 1,307,740 to C. D. Lake, dated June 24, 1919, may be examined for a more complete disclosure. As the gears 55 are turned complementally the brush previously engaging the segment 59 should after this operation engage the segment 58 representing "0". In further detail, in a cycle of machine operation when such a clutch as clutch 230 (Fig. 1) is engaged at the "9" point in the cycle gear 56 would be turned nine steps. Hence, if a brush 206 in the read-out device stood at a position to represent "1", instead of energizing magnet 225 at the "1" point in the cycle to turn gear 56 one step, the inverted wire connections between the emitter 216, 217, 220 and the read-out device in the punching machine comprising line wires 222 of cable 221 would cause the gear 56 to be turned nine steps, in the example just assumed.

It is further pointed out that the two read-out devices 57 and 206 shown in Figs. 1 and 5 are constructed as disclosed in the patent to G. F. Daly, 1,921,454, and they are also similar in construction of certain parts to the usual Hollerith accumulator shown in Patent No. 1,307,740 except that they do not have the tens carry mechanism shown in the last cited patent. This permits the resetting of the read-out devices to zero by the clutches which in Patent No. 1,307,740 are used for entering items in the accumulator but in the present machine are utilized to re-set the brush carrying elements to zero position.

As is shown in the lower part of Fig. 7b the energization of the relay magnet 215 closes contacts $215_{11}$ and these contacts are in series with cam contacts RCC—4 which close after the brushes 57 have been reset to zero position, thereby extending the negative line side 60 to a wire 231 and cause the energization of a relay 232 since the latter is connected at one side to the wire 231 and at the other side to the positive line side 61.

Relay contacts 232a thereupon close, providing a stick circuit for relay magnet 232 from the positive line side 61 through these contacts and normally spring closed relay contacts 233b (Fig. 7a) which are connected to the negative line side 60.

It will be recalled that the cam carrying shaft 86 (Fig. 6) of the punching unit is also rotating and obviously when the CC—6 (Fig. 7a) contacts close by a cam secured to shaft 86 a circuit for relay magnets 233 and 234 will be closed, described as follows: The positive line side 61, magnets 233 and 234 in multiple, cam contacts CC—6, contacts 232b to the negative line side 60. Energization of the magnet 233 opens contacts 233b but the latter are shunted by cam contacts CC—8 which are now closed and this effectively prevents the deenergization of relay magnets 233 and 234 by the opening of contacts 232b, which would be performed if relay magnet 232 was deenergized by opening contacts 233b.

As relay magnet 233 is now energized contacts 233a close and since cam contacts CC—7 are timed to be closed when cam contacts CC—6 are closed, a stick circuit for relay magnets 233 and 234 will be provided by relay contacts 233a and cam contacts CC—7 but the stick circuit is opened at the end of the cycle by opening of contacts CC—7.

It should also be observed with reference to Fig. 7b that when contacts RCC—2 opened during the cycle of operation in which and after the brushes 57 were returned to normal that relay magnets 214 and 215 were deenergized.

Hence relay contacts $215_{1-11}$ will now be opened electrically disconnecting magnets 225 from the read-out device of the punching machine shown in the lower left hand corner of Fig. 7a.

The energization of the relay magnet 234 will cause the concurrent closure of a series of ten relay contacts $234_1$ to $234_{10}$ (see Fig. 7a) and the opening of the series of relay contacts 198. As relay magnet 233 is now energized it will also cause the closure of its relay contacts 233c (Fig. 7a) thereby extending the negative line side 60 through closed contacts 233c to a collector segment 236 of an emitter 237 provided in the punching unit, which is driven by the shaft 118 and designated as "Emitter No. 2" in Fig. 7a. The construction of this emitter is precisely the same as the emitter shown in Fig. 3 and further description need not be given in view of the detailed description previously given for like Emitter #1. The segments 238 of the emitter are connected to the several series of like segments 210 of the read-out device in an inverse manner, similar to that previously described. The complementary timed electrical impulses will be transmitted by line wires 239 to the clutch control magnets 199 through the closed contacts $234_{1-10}$, since contacts $215_{1-10}$ (Fig. 7b) are now open. Magnets 199 (Fig. 5) now receiving the electrical impulses will cause the brushes 206 to rotate in the same direction they were turned to secure their differential adjustment. The series of brushes 206 will now be reset to their normal position. It should be noted that when a brush structure (of either read-out device) is turned a complemental extent that one of the brushes engages the zero segment and in each instance it will comprise the brush which previously engaged the common segmental collector, identified by numeral 59 in Fig. 1 or 212 in Fig. 5.

Referring to Fig. 7a it will be noted that the energization of relay magnet 233 has also closed contacts 233d, thus extending the negative line side to cam contacts CC—10 which are timed to close after the brush structures are reset to their normal positions. This extends the circuit to the segment 210o which is engaged by a special brush 206a. It should be explained with reference to Figs. 5 and 7a that rotatable with each brush structure 206 is a supplemental brush structure, one being designated 206a in Fig. 7a. This brush at the normal or reset position is in engagement with a single segment 206o and a supplemental collector segment 206c. In other words for each denominational order of the read-out device there is a duplication of the structure shown in Fig. 5 and shown diagrammatically in Fig. 7a. The segments of the different orders corresponding to segment 206c are connected by wire connections 240, and in view of the engagement of the brushes, such as 206a, with their segments 206c and zero contact points 206o the circuit is extended by a line wire 241 to the zero segment of the read-out device of the cash register shown in Fig. 7b. The read-out device of the cash register is constructed similarly to that for the punching machine and if the card was punched to represent the same amount as the item set up on the cash register the circuit will be extended, by similar connections described with reference to Fig. 7a, to a wire 242 to cause the energization of a relay magnet 243 (Fig. 7a).

It will be understood that following the cycle of operation of the resetting devices for the read-out device of the cash register the punching machine goes through the fourth effective cycle of operation. During this fourth effective cycle of operation the punching machine read-out device is reset and during this cycle of operation magnet 171 (Fig. 6) is energized to cause the rotation of the feeding rollers 181, 184, 190 and 193 during the fifth effective cycle of operation by the following electrical control.

When magnet 243 (Fig. 7a) is energized relay contacts 243a are closed, thus providing a stick circuit for relay magnet 243 through the right contacts 243b closed when relay magnet 243 is energized, through card lever contacts ECL—2 now closed, to the negative line side. This circuit will retain magnet 243 continuously energized until card lever contacts ECL—2 open.

It will be recalled that magnet 66 is still energized and to prevent its stick circuit through the left contacts 243b from being opened due to the energization of magnet 243 which opens the left contacts 243b, cam contacts CC—3 are provided. These are shunted across the left contacts 243b and close a little time before and also when contacts CC—10 close. Thus, the stick circuit for magnet 66 will extend through contacts 66a, cam contacts CC—3, card lever contacts ECL—1, to the negative line side. When the right contacts 243b close the stick circuit for relay magnet 66 is transferred to the right contacts 243b now providing a common stick circuit for both magnets 66 and 243.

At the beginning of the fourth effective cycle of operation cam contacts CC—7 are closed which retain the energization of the relay 234 and the closure of contacts 234₁₁ (Fig. 7a). When cam contacts CC—9 close a circuit for the clutch control magnet 171 will be completed by the closure of cam contacts CC—9 and contacts 234₁₁. Cam contacts CC—16 together with the closure of contacts 194 which are closed by the energization of magnet 171 provide the usual stick circuit for magnet 171, thus continuing the energization of magnet 171 at the beginning of the fifth effective cycle of operation. At this time the notch in disk 174 (Fig. 6) will be engaged by the end of the clutch pawl 176 thus causing the feeding rollers 181, 184, 190 and 193 to rotate. Cam contacts CC—16 retain the energization of magnet 171 during the fifth cycle beyond the middle thereof so that another rotation of shaft 173 will ensue, which necessity was previously described.

When cam contacts CC—16 open magnet 171 will be deenergized. However, contacts CC—9 close shortly thereafter and since contacts 243c are now closed (because card lever contacts ECL—2 are closed) another energization of magnet 171 will be effected and its energization will be continued and extended to and during the sixth effective cycle of operation by cam contacts CC—16.

It will be noted that cam contacts CC—7 open near the end of the fourth effective cycle of operation to cause magnets 233 and 234 to be deenergized. Of course, this causes relay contacts 234₁₁ to be opened so contacts 243c are provided to cause the energization of magnet 171 when cam contacts CC—9 close. These contacts 243c are shunted across contacts 234₁₁.

At the beginning of the fifth cycle of operation the card is between sets of rollers 181, 184, (Fig. 5) and at the end of the fifth effective cycle the card is between the sets of rollers 193—184.

At the beginning of the sixth cycle the card is still being fed and by means of the rollers 193 the card which has been found to be punched correctly is fed into a receptacle 245. At the beginning of the sixth effective cycle of operation card lever contacts ECL—2 open, thus resulting in the deenergization of magnets 243 and 66.

Since relay magnet 66 is now deenergized stick contacts 66c (Fig. 7a, upper middle) will open to cause deenergization of relay magnet 63. Contacts 63b will now open to attempt to stop the operation of motor N of the cash register and motor M of the punching device. It should be noted that cam contacts CC—2 are shunted across contacts 66c and they will hold the energization of relay magnet 63 even though contacts 66c open. This will insure a sufficient operation of the motor M so that feed rollers 193 will feed the card to allow it to drop in the receptacle 245.

It should be noted that when contacts 63d (Fig. 7a) closed due to the energization of relay magnet 63 caused by the depression of the start key ST that by a wire 246 a circuit for a locking magnet 247 (Fig. 7b) was closed. Magnet 247 is shown in Fig. 4 and when energized it operates a lever 248 to bring a notch 249 thereof into locking cooperation with a square stud 250 attached to the gear 31. This will prevent any operation of the cash register during the operation of the punching machine and in view of the holding of contacts 63d closed during the six cycles of operation the magnet 247 will retain the locking lever 248 in a locking position during this time. When contacts 63d open the operating handle 29 (Fig. 4) will be unlocked so that another item entry operation may be instituted.

The last described operation assumes that the card was punched correctly and corresponded in each column punched with the value of the item entered by the various banks of keys of the cash register. If the card is punched to represent the incorrect amount, this amount will, nevertheless, be set up on the read-out device of the punching machine and will subsequently be reset. The true amount which was to be punched on the card was, however, set up on the read-out device of the cash register and as this read-out device is reset under control of the incorrectly set read-out device of the punching machine, one or another of the brush structures 57 will fail to return to normal position. Hence, the circuit to the relay magnet 243 will not be energized when contacts CC—10 close at the end of the resetting of the read-out device of the punching machine. Under certain other conditions, relay magnet 243 will also fail to be energized when contacts CC—10 close. For example, the amount entered in the cash register may be correctly represented by perforations on the card but due to some mechanical or electrical failure one or another of the brush structures 207 of the read-out device of the punching machine (see Fig. 5) will not be turned to normal. Again, the brush structures 57 (Fig. 1) of the read-out device of the cash register may not return to normal due to some mechanical or electrical failure, even though the read-out device of the punching machine was correctly set to represent the amount entered on the cash register.

It is desirable that the operator be apprised of any of the above described faulty operations, or others, since the correctness of subsequent card punching operations is entirely dependent upon whether or not the read-out devices of the punching machine and cash register are at normal at the beginning of an item entry operation of the cash register. There will now be described the means whereby incorrectly unched cards will be selectively disposed in a reject pocket designated by numeral 251 in Fig. 5.

As previously stated during the fourth cycle of operation of the punching machine in which the read-out device of the punching machine is reset, contacts CC—10 close but since the circuit to relay magnet 243 (Fig. 7a) is not closed when the brush structures of either read-out device are not at normal contacts designated 243d (Fig. 7a) will remain closed.

However, the energization of the clutch control magnet 171 (Fig. 7a) will be effected by the circuit previously traced and described so that the incorrectly punched card will be fed during the fifth effective cycle of machine operation.

When the card is fed to the left (Fig. 5) by the rollers 181 card lever contacts ECL—1 of the left pair (Fig. 7a) will be closed early in the cycle and since at this time contacts designated 243d (Fig. 7a) are closed, it will be observed that a circuit for a relay magnet 252 will be closed, said circuit leading from the positive line side 61 through magnet 252, contacts 243d now closed, card lever contacts ECL—1 of the left pair now closed to the negative line side 60.

Relay contacts 252a will now close providing a stick circuit for the relay magnet 252 through contacts 252a, stop key contacts SP₁ of the punching machine and stop key contacts SP₂ (Fig. 7b) of the cash register. The energization of magnet 252 will continue until either of these stop key contacts are manually opened.

It should be observed that the opening of the right (Fig. 7a) card lever contacts ECL—1 (Fig. 7a) will open the circuit to the magnet 66. This will result in the opening of contacts 66c and the subsequent deenergization of relay magnet 63 when cam contacts CC—2 open late in the cycle. The deenergization of the magnet 63 caused by the opening of contact CC—2 will permit the opening of contact 63d and attempt to cause the deenergization of the locking control magnet 247 (see Fig. 7b) to release the cash register for operation. However, under the incorrect conditions now being assumed, it is necessary that the cash register be locked and it is maintained locked by means of contacts 252d (Fig. 7a) upper right which were closed previous to the opening of contacts 63d. When locking magnet 247 (Fig. 7b) was energized, it closed its contacts 247a. The circuit for the locking magnet 247 will therefore now be extended through contacts 247a, maintained by contacts 252d, to the positive line side 61. As previously stated, magnet 252 which causes contacts 252d to be closed will be retained energized until either the stop key of the cash register or the stop key of the punching machine is manually depressed. The depression of either stop key will therefore release the cash register for a subsequent entry operation.

There will now be described certain operations which take place after the resetting of the read-out device of the punching machine which, it will be recalled, occurs during the fourth effective cycle of machine operation.

Referring to Fig. 7a and understanding that since magnet 243 is not now energized due to an incorrect reset operation, it will be noted that contacts 243e will remain closed. When cam contacts CC—11 close, cam contacts CC—7 are also closed for retaining magnet 233 energized, so that contacts 233e are closed. A circuit will therefore be instituted from the negative line side 60 (Fig. 7a) through relay contacts 233e now closed, relay contacts 243e now closed, cam contacts CC—11 now closed, to a magnet 256 which is connected to the positive line side 61. When magnet 256 is energized, it causes the closure of its own contacts 256a to provide a stick circuit through these contacts, contacts 257a, cam contacts CC—12 to the negative line side 60. Cam contacts CC—12 are timed to be closed at the time contacts CC—7 and CC—11 are closed. Cam contacts CC—12 will, therefore, continue the energization of magnet 256 at the beginning of the fifth effective cycle of machine operation. At the beginning of this cycle of operation, card feeding rollers 184 (Fig. 5) which engage the leading edge of the card are rotated. When the magnet 256 (see Fig. 6) is energized, it will attract its armature 258 to rock a shaft 259 to which the armature is attached. Attached to the shaft 259 as observed in Fig. 5 is a vane or card deflecting plate 260. When the magnet is energized, the free end of the deflector plate 260 is elevated a slight extent and as the incorrectly punched card is now being fed by the rollers 184, it will be observed that the card is guided in the reject pocket 251 during the fifth effective cycle of machine operation.

It is desirable that magnet 256 remain energized during this cycle of operation and during a portion of the next in order to insure that the card will be properly fed. The following described circuits adequately provide and insure the desired operation.

During the fifth effective cycle of machine operation, contacts CC—13 close and since contacts CC—12 are now closed, the negative line side 60 will be extended through cam contacts CC—12, contacts 257a, contacts 256a, through cam contacts CC—13 to a relay magnet 257. This will cause the opening of contacts 257a and an attempt to open the circuit to relay magnets 256 and 257. However, at the time contacts CC—13 close, contacts CC—14 are also closed and since contacts CC—14 are shunted across contacts 257a neither relay magnets 256 nor 257 will be deenergized. When relay magnet 257 is energized, relay contacts 257b will be closed thereby extending a circuit from the negative line side through cam contacts CC—15 which are closed at the time cam contacts CC—14 open, a wire 261, relay contacts 257b now closed, contacts 256a, relay magnet 256 to the positive line side. Obviously, the energization of the deflector control magnet 256 is now under control of the cam contacts CC—15. Since cam contacts CC—15 are closed at the time contacts CC—13 close, relay magnet 257 will be held energized under control of cam contacts CC—15. When relay magnet 257 is energized, it will close its contacts 257c, and as said contacts are in series with cam contacts CC—15 it will be noted that the energization of relay magnet 257 will now be continued and placed under control of the cam contacts CC—15 after cam contacts CC—13 open.

When cam contacts CC—15 open, relay magnets 256 and 257 will be deenergized and due to the deenergization of magnet 256, the deflector plate 260 (Fig. 5) will assume its normal position shown in Fig. 5 by means of a spring 262 (Fig. 6) attached to the armature 258 of magnet 256.

While the preceding description has described a machine which is fully operative for all purposes, there will now be described certain adjuncts in the nature of distinctive signalling devices which indicate to the operators of the cash register and the punching machine that certain operations have been properly completed or improperly carried out.

These various signal devices are illustrated only in the electrical wiring diagram in Figs. 7a and 7b but are attached to the different machines. Reference numerals 263 and 264 indicate electrical lamps which are colored green. The lamp 263 is located at the punching machine for observance by the operator controlling the punching machine while the lamp 264 is visible to the operator of the cash register since it is located thereon. The circuit for lamps 263 and 264 start from the positive line side 61, through contacts 63d which are closed when relay magnet 63 is energized, contacts 252b which are closed when magnet 252 is deenergized and then from said contacts 252b to lamps 263 and 264, the other side of each lamp being connected to the negative side. If the punching operation has been correct and both of the read-out devices have been returned to normal, magnet 63 will remain energized and relay magnet 252 deenergized thereby causing their respective contacts 63d and 252b to be closed.

Therefore, when the start key of the cash register ST is depressed, lamps 263 and 264 will be initially lighted and will remain illuminated until the end of the sixth effective cycle of the operation of the punching machine when they will be automatically extinguished. The illumination of the lamps informs both operators that the punching machine is in operation.

Distinctively colored lamps, designated 265 and 266, in the wiring diagram indicate to the operators of both machines that some operation has been incorrectly performed, as has been previously described. These lamps 265 and 266 are preferably colored red and they are illuminated during the operation of the punching machine when an incorrect operation has been performed. The circuits for both lamps 265 and 266 are controlled by contacts 252c which are closed when relay magnet 252 is energized. Such energization, it will be recalled, is instituted when either read-out device fails to return to normal.

It is desirable that the operators of both machines be informed when there is no card in the hopper 67 of the punching machine.

It will be recalled that the card lever contacts MCL (Fig. 5) are closed only when there is a card in the magazine 67. On the presence of a card therein these contacts will close to cause the energization of relay magnet 69 and the opening of contacts 69b to extinguish a pair of lamps. These lamps which indicate to the operators by their lighting the absence of a card in hopper 67 are preferably colored yellow and are designated by reference numerals 267 and 268.

One side of each of said lamps is connected to the positive line side 61 and the other sides of each of the lamps are connected to the negative line side through contacts 69b. Upon the feeding of the last card in the magazine both lamps will be illuminated informing the operators of this condition. When cards are replenished in the hopper 67 the lamps will again be extinguished.

It is, furthermore, desirable to perforate the card in one or more columns to designate some fixed data, as for example, the clerk operating the machine. In the event that the same clerk repeatedly operates the same cash register it is desirable that this repetition of data be effected automatically without the necessity of repeatedly depressing the same key.

Referring to Fig. 2, it will be understood from the well known construction of the cash register that when a key is depressed its detent segment 13 will be elevated and it will be held elevated by means of the usual spring urged locking bar 270 which upon depression of a key springs rearwardly so that its shoulder 271 engages the lower part of the segment 13. The machine is provided with a conventional lock 272 and when the key 273 thereof is rotated by the clerk retaining the key 273 its latch 274 will engage a notch 275 of the raised detent 13. This will retain the depressed key 10 continually depressed and effect the same setting of its gear 36 for each machine operation. Obviously, the brush structure 57 of the corresponding order will be rotated to the same position for each cash register operation. By means of the plug connections 124 (Fig. 7b) and 127 (Fig. 7a) this order of the read-out mechanism of the cash register can be plugged to control the energization of one of the punching control magnets 128.

This will cause punching in a column to represent the same data, as for example, the clerk operating the machine, in each of a series of punched cards.

It is also desirable to designate on each card punched the number of the punching machine. This will permit identification of the source of punching. To this end the punching machine is provided with a read-out mechanism of preferably four orders to set up any digit from 0000–9999. The brush structures 276 (Fig. 5) of each order are manually settable by notched wheels 277 so that one of the brushes engages a particular segment 278 representing the digit set up. Obviously, the brush structures 276 remain in the position they are set. The emitter designated "Emitter No. 1" in Fig. 7a also has wire connections in a cable 279 to the various segments, in the manner previously described, except in this case, the segment 121 of the emitter relating to a digit is connected in multiple to the segments 278 relating to the same digit of the read-out device now described and so on. In this instance it is desired to punch to represent the same numbers set up by the wheels 277 and the wire connections are not complementarily arranged in this case. By means of plug connections 280 (Fig. 7a) the read-out device may be plugged to control the energization of selected punch control magnets 128. These will control the punching of fixed data on each of a series of cards, representing, for example, the number of the punching machine, a date, etc.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. The combination with entry receiving means of an adding machine for receiving an entry made therein, a punching means, means for causing said punching means to punch under control of said entry receiving means a card to represent the entry, means for analyzing the punched card, a second entry receiving means, means controlled by said analyzing means for entering in the second named entry receiving means the entry represented by the punched card, means for causing the automatic operation of said analyzing means at the completion of the operation of the punching means, means controlled by one of said entry receiving means for entering an amount in the other entry receiving means to reset the same to zero when the card is punched to represent the same amount entered in said first named entry receiving means, means to determine whether said other receiving means is re-set to zero to determine whether the card is punched to represent the same entry entered in the first-named entry receiving means, and means controlled by said last-named determining means for controlling the operation of the machine in accordance with the resetting of said other entry receiving means to zero or not.

2. A checking device for a machine of the class described, provided with means for punching a record to represent an entry made in said machine, entry receiving means, means under control of the latter for controlling the operation of said punching means, a second entry receiving means, means for analyzing the punched record, means for causing the automatic operation of said analyzing means at the completion of the operation of the punching means, means under control of said analyzing means for entering the entry punched on said record in said second named entry receiving means, comparing means for comparing the entries in both of the aforesaid entry receiving means comprising means for transferring the complement of the entry in one of said entry receiving means to the other of said entry receiving means to restore the latter to zero when the entries in each are alike, and means controlled by said other entry receiving means for controlling the operation of the machine in accordance with the resetting of said other entry receiving means to zero or not indicating a comparison or non-comparison, respectively.

3. The combination with entry receiving means of an adding machine for receiving an entry made therein, a punching means, means controlled by said entry receiving means to effect the operation of the punching means to punch a card to represent the entry, means for analyzing the punched card, a second entry receiving means controlled thereby for receiving an entry represented by the punched card, means including means controlled by the second named entry receiving means for causing both of said entry receiving means to be successively reset to zero, and means cooperating with both of the aforesaid entry receiving means to determine if both are reset to zero and which condition represents a correspondence between the entry represented by the punched card and the entry in the first named entry receiving means.

4. A machine of the class described comprising, means settable for representing data to be transmitted, punching means, means under control of said settable means for transmitting said data to said punching means for making a punched record to correspond with the data represented by said settable means, means for thereafter analyzing said punched record, means for causing the automatic operation of said analyzing means at the completion of the operation of the punching means, means under control of said analyzing means and said settable means for determining whether the punched record data corresponds with the data represented by the setting of said settable means, and an operation manifesting means controlled by said determining means for manifesting whether the punched record data corresponds with or does not correspond with the data represented by said settable means.

5. In combination, an accounting machine having devices settable in accordance with an entry made in said accounting machine, a structurally separate punching machine, punching means in the latter, interconnecting means between both of said machines and under control of said settable devices for controlling said punching means for causing a card to be punched in accordance with the entry represented by said settable devices, means in said punching machine for analyzing the punched card, means in said punching machine for causing the automatic operation of said analyzing means at the completion of the operation of said punching means, means under control of said analyzing means and said settable devices for determining whether the punched record data corresponds with the data represented by the setting of the settable devices, and a succeeding operation control means for said accounting machine controlled by said determining means for controlling the operation of the accounting machine in accordance with a comparison or a lack of comparison.

6. In combination, an accounting machine having entry controlling devices, devices settable under control of said entry controlling devices to receive an entry to correspond with the entry made in the accounting machine, a separate punching machine, punching means in the latter, interconnecting means between both of said machines and under control of said settable devices for causing said punching means to punch a card in accordance with the entry represented by said settable devices, means for analyzing the punched card, means under control of said analyzing means and said settable devices for determining whether the punched card data corresponds with the entry represented by the setting of the settable devices, successively acting operation initiating means for automatically initiating the operation of said analyzing means at the completion of the operation of said punching means and for causing said determining means to be operated in timed relation with the operation of said analyzing means, and means controlled by said determining means and operative in accordance with the correspondence or lack of correspondence of the punched card data and the data represented by said settable devices.

7. A machine of the class described comprising, means settable for representing data to be transmitted, punching means, means under control of said settable means for transmitting said data to said punching means for making a punched record in accordance with the data represented by said settable means, means for thereafter analyzing said punched record data, means under control of said analyzing means and said settable means for determining whether the punched record data corresponds with the data represented by the setting of the settable means, successively acting operation initiating means to cause the automatic operation of said analyzing means at the completion of said punching operation and for causing said determining means to be operated in timed relation with the analyzing means, and an operation manifesting means controlled by said determining means for manifesting whether the punched record data corresponds with or does not correspond with the data represented by said settable means.

8. A machine of the class described comprising, set-up means for representing data to be recorded, recording means, means under control of said set-up means for causing said recording means to make a record of said data, means for thereafter analyzing the record, means controlled by said analyzing means and said set-up means for thereafter determining whether the record made corresponds with or does not correspond with the data represented by said set-up means, means for initiating the operation of said recording means, means brought into operation by the operation of said recording means for effecting the automatic operation of said analyzing means at the completion of the operation of said recording means, and means controlled by said determining means and operative in accordance with the correspondence or lack of correspondence of the recorded data and the data represented by said set-up means.

9. A machine of the class described comprising, set-up means for representing data to be recorded, recording means, means under control of said set-up means for causing said recording means to make a record of said data on cards, means for thereafter analyzing the cards, means under control of said set-up means and said analyzing means for thereafter determining whether the record made corresponds with or does not correspond with the data represented by said set-up means, means for initiating the operation of said recording means, means brought into operation by the operation of said recording means for effecting the automatic operation of said analyzing means at the completion of the operation of the recording means, means for feeding said cards to said recording means, means controlled by said initiating means for causing the operation of said feeding means, means for selectively segregating the cards when they are determined to be recorded incorrectly, and means controlled by said determining means for causing the operation of said segregating means selectively dependent upon whether the recorded data corresponds with the data represented by said set-up means.

10. In a machine of the class described, the combination with entry receiving devices of an adding machine, of punching means, controlling means therefor under control of said entry receiving devices for causing said punching means to make a punched record for each entry in the adding machine, analyzing means for analyzing the punched record, means under control of said analyzing means and said entry receiving devices for determining whether the record punched represents the same entry represented by said entry receiving devices, means for selectively segregating the punched records when they are determined to be incorrectly punched, means controlled by said determining means for causing the operation of the last-named means selectively dependent upon whether the punched record represents the same entry represented by said entry receiving devices, and means in said punching machine for causing said determining means to be operated in timed relation with the operation of the analyzing means.

11. In a machine of the class described, the combination with entry receiving devices of an adding machine, of an operating mechanism therefor for effecting entries therein, a structurally separate recording machine comprising recording means, means for interconnecting both of said machines for causing under control of said entry receiving devices the operation of the recording means to make a record of the entry represented by said entry receiving devices, means for analyzing the record, means under control of said analyzing means and said entry receiving devices for determining whether the record made corresponds with or does not correspond with the entry represented by said entry receiving devices, and means controlled by the determining means for rendering said operating mechanism incapable of operation for effecting a subsequent entry in said adding machine when the record made is found to be incorrect.

12. In a machine of the class described, the combination with an entry means comprising entry controlling means, an entry receiving means controlled thereby, and an operating means for effecting an entry in said entry receiving means under control of said entry controlling means, of a punching mechanism, means under control of the entry receiving means for causing said punching mechanism to punch a record to represent the entry represented by said entry receiving means, manual means located at said entry receiving means for causing an initiation of the operation of the punching mechanism, means for thereafter analyzing the punched record, means cooperatively related with said entry receiving means and said analyzing means and under control thereof for determining whether the entry represented by the record punched corresponds with or does not correspond with the entry made in said entry receiving means under control of the entry controlling means, locking means for locking said operating means, means for rendering the locking means effective upon initiation of the operation of the punching mechanism and maintaining the locking means effective during the operation of the punching mechanism and determining means, means controlled by said determining means to maintain the locking means in effective locking condition after the operation of the determining means when a record is found to be punched incorrectly, and manually operated means located at said entry means for releasing said locking means.

13. In a machine of the class described, the combination with an adding machine including an operating mechanism and entry receiving devices controlled thereby, of a punching mechanism, means under control of said entry receiving devices for causing said punching mechanism to punch a card in accordance with the entry represented by said devices, a locking mechanism for said operating mechanism, means operable at said adding machine for initiating an operation of said punching machine and for concurrently causing the operation of said locking mechanism for locking said operating mechanism, means for thereafter analyzing the punched card, means under control of said analyzing means and said entry receiving devices for determining whether the card is punched to represent the same value as is represented by the entry receiving devices, means operable for maintaining said locking mechanism in locking condition during the operation of the punching mechanism and said determining means and means under control of said determining means and operated when a card is found to be punched incorrectly for causing said locking mechanism to be maintained in effective locking condition after the operation of said determining means to lock said operating mechanism.

14. In a machine of the class described, the combination with differentially settable entry representing devices of an adding machine, of means under control of said entry representing devices for punching a record in accordance with the entry represented by said devices, means for analyzing the punched record, means differentially settable under control of said analyzing means, means for comparing the setting of said entry representing devices with said settable means comprising means for causing the first-named entry representing devices to be reset to zero under control of the last-mentioned settable means and including means to determine whether the first-named entry representing devices are set to zero to determine whether the card was punched to represent the same entry represented by said entry representing devices, means for initiating the operation of said punching means, and means operated by the operation of said punching means for automatically initiating the operation of said analyzing means at the completion of the punching operation.

15. In a machine of the class described, the combination with entry receiving means, punching means, means controlled by said entry receiving means for controlling the operation of the punching means to punch a card to represent an entry, means for analyzing the punched card, means controlled by the latter for receiving the entry represented by the punched card, checking means including means under control of one of said entry receiving means to reset the other entry receiving means to zero and means to determine whether said other receiving means is reset to zero to determine whether the card is punched to represent the same entry entered in the first-named entry receiving means, a signaling device, means controlled by said other entry receiving means and rendered effective when it is not reset to zero for causing said signaling device to be illuminated to indicate that the card is punched incorrectly.

JAMES W. BRYCE.